Nov. 14, 1961  TOKUTARO IEDA ET AL  3,008,395
PHOTOGRAPHIC CAMERA SHUTTER ACTUATING MECHANISM
Filed March 12, 1957  2 Sheets-Sheet 1

INVENTORS
TOKUTARO IEDA
RYOICHI KOJIMA
MAKOTO YOKOTA

By Otto John Munz
ATTORNEY

INVENTORS
TOKUTARO IEDA
RYOICHI KOJIMA
MAKOTO YOKOTA

ATTORNEY

United States Patent Office 3,008,395
Patented Nov. 14, 1961

3,008,395
PHOTOGRAPHIC CAMERA SHUTTER
ACTUATING MECHANISM
Tokutaro Ieda, Moto-machi, Urawa-shi, Ryoichi Kojima, Itabashi-machi, Itabashi-ku, Tokyo-to, and Makoto Yokota, Nishisugamo, Toshima-ku, Tokyo-to, Japan, assignors to Kabushiki Kaisha Koparu Koki Seisakusho (known as Copal Koki Co., Ltd.), Tokyo-to, Japan
Filed Mar. 12, 1957, Ser. No. 645,579
2 Claims. (Cl. 95—11.5)

The present invention relates to improvements of photographic camera shutter and particularly to photographic camera shutters of a new type, in which the combination of a shutter operating device, a device for opening and closing the electric circuit for flash synchronization, a slow governor and a self-timing device is remarkably different from that of a conventional photographic camera shutter.

A primary object of this invention is to provide a photographic camera shutter of a new type, in which a shutter operating device, a device for opening and closing electric circuit for flash synchronization, a synchronizer delay mechanism and a self-timing device can be operated simultaneously or selectively by the driving movement of a setting ring upon release.

Figures 1, 6:
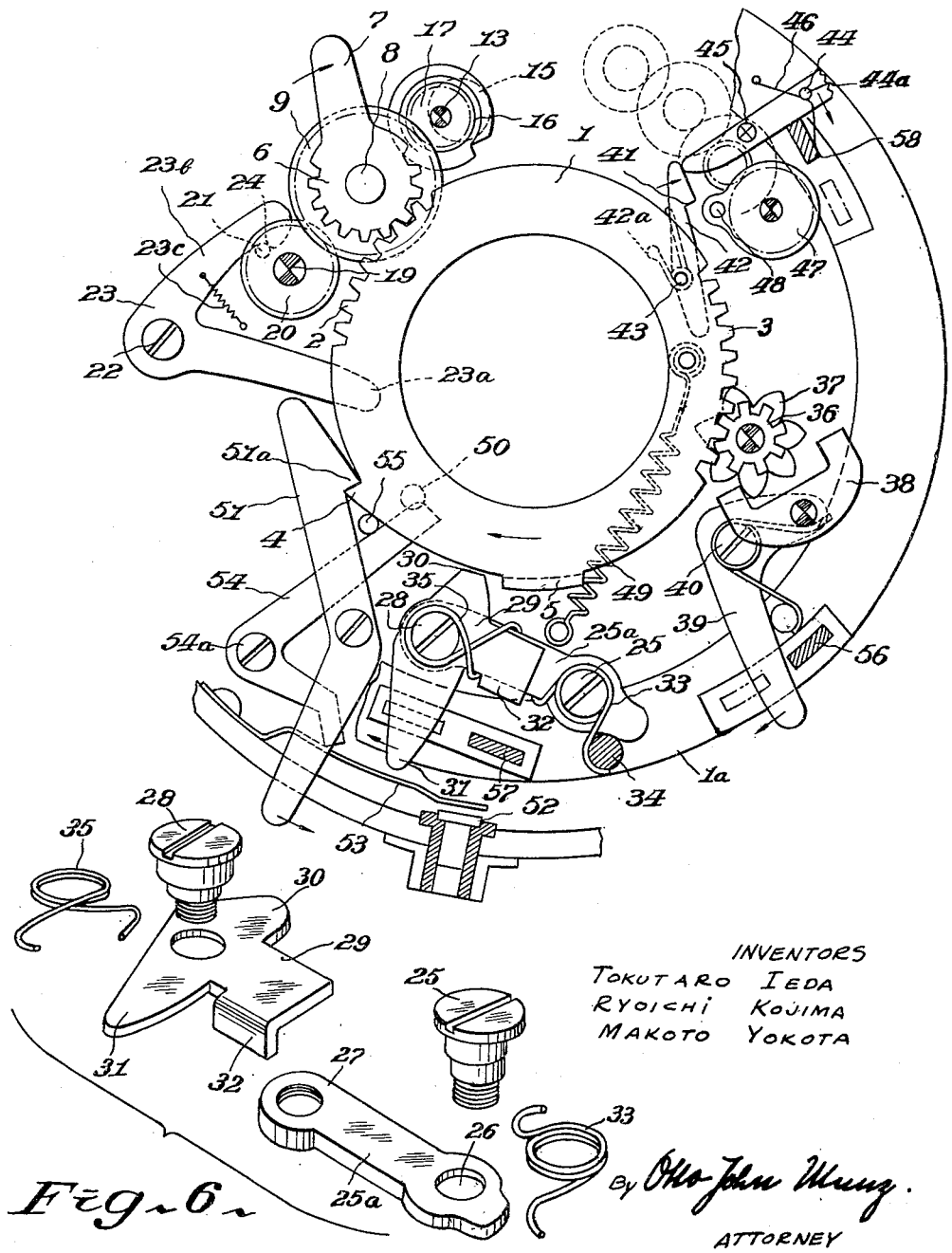
Figure 2:
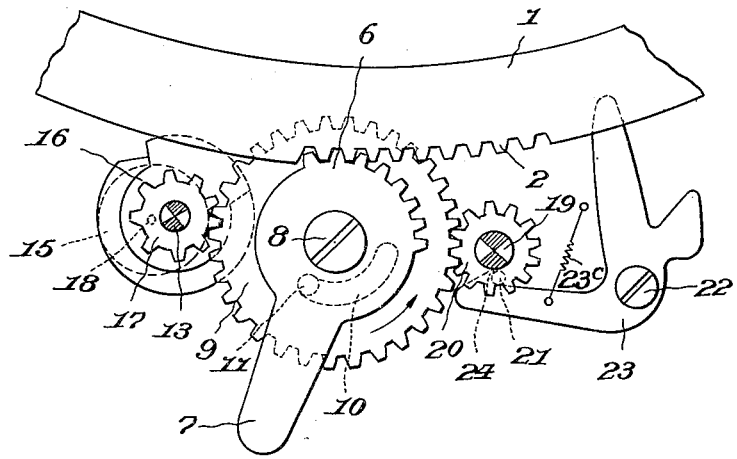
Figure 3:
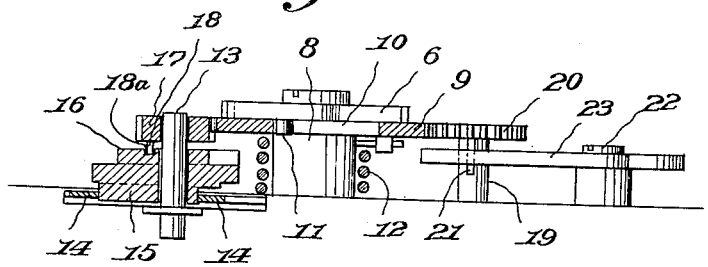
Figure 4:
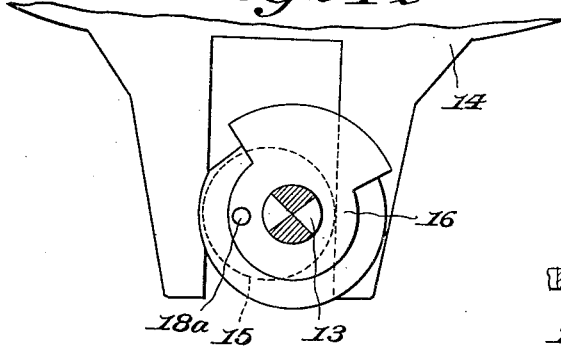
Figure 5:
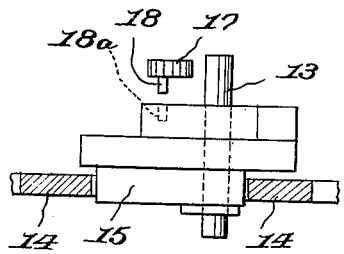

Other objects of the invention will become apparent from the following description taken in conjunction with the appended claims and in connection with the accompanying drawings in which:

FIG. 1 is a front view of an example of this invention.
FIG. 2 is an enlarged front view of only the shutter operating device in the example in FIG. 1.
FIG. 3 is a sectional side view of the device in FIG. 2.
FIG. 4 is a plan view of one part of the shutter operating device in FIG. 2.
FIG. 5 is a side view of the part in FIG. 4; and
FIG. 6 is an expanded view of the individual members composing a device for operating contact means depicted in the example in FIG. 1.

Referring to FIGS. 1–6, the photographic camera shutter comprises a shutter operating device, a device for closing and opening an electric circuit for flash synchronization, a synchronizer delay mechanism for braking the setting ring, and a self-timing device, said devices being described as follows:

(A) SHUTTER OPERATING DEVICE

The shutter operating device comprises a setting ring 1 which is rotatably arranged around an objective-lens cylinder not shown in the conventional manner. The setting ring is provided on its outer rim with gear-sectors 2, 3, a projection 4, and a lug 5. A pinion 6 having an extension lever 7 meshes with the gear sector 2. On the shaft 8 of the pinion 6 is rotatably mounted a gear 9 provided with an arcuate slot 10. See FIGURES 2 and 3. The pinion 6 has a pin 11 pointing downwards which engages arcuate slot 10. A spiral spring 12 is wound around the shaft 8, and has one end fixed to a stationary portion of the shutter plate, not shown, and its other end to a portion of the gear 9 so that this gear is thereby continuously urged in the direction of rotation indicated by the arrow, FIGURE 1.

A shaft 13 is arranged parallel to shaft 8 and a cam 15 for operating a shutter blade operating ring 14, another cam 16 cooperating with a time adjusting governor, not shown, and a pinion 17 are all journaled on shaft 13. Cams 15 and 16 are integrally connected to form a unitary element as clearly shown upon FIGURE 3. The pinion 17 is provided on its underside with a pin 18 engaging a hole 18a provided in the unitary element forming cams 15 and 16. See FIGURE 3. The end of this pin is formed as a one-way pawl which engages and rotates the element when pinion 17 is rotated in a direction corresponding to operation of the shutter, but, in the reverse direction of rotation of pinion 17, rides up on the adjacent face of the element. For this purpose, pinion 17 has a greater axial dimension than gear 9 so that, as clearly indicated upon FIGURE 3, the two remain in mesh at all times.

A shaft 19 is arranged at the side, of shaft 8 opposite to shaft 13. A pinion 20 is rotatably mounted on shaft 19, pinion 20 meshing with gear 9 and being provided on its underside, with a pin 21. The pin 21 is positioned so as to engage with a hook 24 formed at the end of one leg 23b of a shutter blade release lever or bell-crank 23, pivoted on a stationary shaft 22. The bell-crank 23 is provided with a spring 23c which in turn acts to urge the hook 24 into engagement with the pin 21.

(B) DEVICE FOR OPENING AND CLOSING THE ELECTRIC CIRCUIT FOR FLASH SYNCHRONIZATION

This device comprises a stationary shaft 25 which is arranged close to the lug 5 of the setting ring 1. An oscillatable piece or spring-loaded lever 25a has a bearing hole 26 at one end by which it is journaled on shaft 25. See FIGURE 6. The opposite end of oscillatable piece 25a is provided with a threaded hole 27 in which is screwed a shaft 28. A contact operating lever 29 is pivoted on shaft 28. The contact operating lever 29 is provided with two fingers 30 and 31 in the directions perpendicular to the longitudinal direction of the lever and with a lug 32 which is bent downward so as to engage with the oscillatable piece 25a. A spiral spring 33 wound around the shaft 25 is engaged at one end thereof with a stationary pin 34 and at the other end thereof with one side edge of the oscillatable piece 25a so as to force said oscillatable piece 25a in a clockwise direction.

The ends of a spiral spring 35 wound around the pivot shaft 28 are engaged, respectively, with the side edges of the contact operating lever 29 and oscillatable piece 25a. A stationary contact 52 and a movable contact piece 53 for closing the electric circuit for flash synchronization are arranged so that contact 53 may be brought in contact with contact 52 by means of the finger 31 when piece 25a rotates counterclockwise from the position shown upon FIGURE 1.

(C) SELF-TIMING DEVICE INCLUDING A SYNCHRONIZER DELAY MECHANISM FOR THE SETTING RING 1

This device comprises a pinion 36 in mesh with the teeth 3 of the setting ring 1 and a star gear 37 attached with a common axis to said pinion 36 for rotation as a unit. The star gear 37 is engaged with an escapement lever 38 so as to brake the rotation of the setting ring 1. The escapement lever 38 is pivoted on the end of one leg of a bellcrank 39 which in turn is pivoted on shaft 40. The said members 37, 38 and 39 are combined so that when one leg of the lever 39 is rotated in the direction of the arrow, FIGURE 1, the lever 38 carried thereby, is moved out of engagement with star wheel or gear 37.

(D) SELF-TIMING DEVICE

This device comprises a pawl lever 42 which is pivoted at one end to the setting ring 1 on a pin 43 and is provided with a hook 41 at one end thereof. Lever 42 is urged outward by a spring 42a to a position wherein hook 41 is urged outward from the periphery of the setting ring 1. An exchange lever 44 pivoted on shaft 45 is normally set at the position as shown in FIGURE 1 so as to hold the pawl lever 42 in the position shown. The lever 44 is retained at its predetermined position by a wire spring 46 bearing on pin 44a attached to said lever 44. The gear 47 is one of a set of gears and is provided with a standing pin 48 at its projected lug portion. Pin 48 is positioned in the path of the hook 41 of the pawl 42 in the case of outward pivoting thereof.

The mechanism shown in FIGS. 1–6 comprises a power spring 49 connected at its one end with the setting ring 1 and at its other end with a stationary portion of the shutter plate, a pin 50 attached to the ring 1, a release lever 51 provided with a spring not shown for turning the said lever clockwise as viewed upon FIGURE 1, and having a hook 51a engageable with the projection 4 of the setting ring 1, a contact lever 54, a pin 55 fixed to the shutter blade operating ring 14 shown in FIGURE 4 and said pin 55 held in contact with the contact lever 54, and pawls 56, 57 and 58, the said pawls being connected to a suitable member which can be rotated, for instance, by a slip ring 1a and mounted concentrically with the setting ring 1 so as to displace, simultaneously or selectively, the said pawls.

*Setting operation of the mechanism illustrated in FIGS. 1–6*

When the setting lever 7 is rotated clockwise, the pinion 6 also rotates clockwise, so that the setting ring 1 rotates counterclockwise, whereby the projection 4 of the said ring 1 engages behind hook 51a of the release lever 51, as shown in FIG. 1. In this state, the power spring 49 is tensioned so as to store the force necessary to return the ring 1 to its initial position.

At the same time, with the rotation of the pinion 6, the pin 11 of the pinion 6 rotates the gear 9 clockwise, whereby the spring 12 is tensioned. With rotation of gear 9, pinion 20 rotates counterclockwise, whereby pin 21 engages leg 23b of bellcrank 23 and pivots the bellcrank counterclockwise against the force of the spring 23c until hook 24 snaps over pin 21, as shown in FIG. 1. In this state, the spring 12 urges pin 21 into engagement with hook 24.

*Actuating operation*

When the pawls 56, 57 and 58 are set at their positions shown by full lines in FIG. 1 and release lever 51 is pushed in the direction of the arrow in FIG. 1, hook 51a of lever 51 disengages from projection 4 of setting ring 1 and the force of the spring 49 is released, so that the setting ring 1 starts to rotate clockwise as shown by arrow line in FIG. 1.

However, the return rotation of the setting ring 1 is retarded by escapement lever 38 through the star gear 37 combined with the pinion 36 which in turn meshes with the gear sector 3 of the setting ring 1.

Upon starting of the return rotation of the setting ring 1, first lug 5 acts to strike finger 30 of contact operating lever 29, whereby lever 29 is pushed in counterclockwise direction around pivotal shaft 28 causing oscillatable piece 25a to move counterclockwise against the force of spring 33. Accordingly, finger 31 of lever 29 moves contact 53 into engagement with stationary contact 52 to thereby close the electric circuit for flash synchronization. Upon separation of lug 5 from finger 30, oscillatable piece 25a and contact operating lever 29 return to their original positions and the above-mentioned electric circuit is opened.

The position of the pin 50 attached to the setting ring 1 is so selected that it strikes leg 23a of bell-crank 23 at the moment when lug 5 separates from finger 30, to thereby actuate bell-crank 23 and disengage hook 24 from pin 21.

By said disengagement, spring 12 is released and gear 9 rotates, correspondingly rotating cam 15 through the pinion 17 and pin 18.

Rotation of the cam 15 effects operation of shutter blade operating ring 14, thus opening and closing the shutter.

As will be understood from the above description, when the mechanism is operated after previous setting of the exchange pawls 56, 57 and 58 at the positions as shown by full lines in FIG. 1, the electric circuit for flash synchronization is closed just before operation of the shutter blades, whereby flash synchronization accommodated to a flash lamp of the so-called "M" class is effectively carried out.

However, when the exchange pawls 56 and 57 are previously set at the positions as shown by broken lines in FIG. 1, the pawl 56 pushes one leg of the bell-crank lever 39 in the direction indicated by the arrow, FIGURE 1, so that the escapement lever 38 attached to the other leg of lever 39 is detached from the star gear 37, whereby the braking device is rendered ineffective. At the same time, pawl 57 pushes finger 31 of contact operating lever 29 in the direction indicated by the arrow, FIGURE 1, so that lever 29 rotates clockwise around shaft 28 and the other finger 30 of lever 29 is set to a position clear of path of lug 5, whereby the flash circuit is rendered ineffective. When the pawls 56, 57 and 58 are set at the positions shown by broken lines in FIG. 1 and the mechanism is cocked by rotation of setting lever 7 and then release lever 51 is operated, ring 1 is immediately returned to its original position by spring 49 and the shutter blades are operated when leg 23a of lever 23 is engaged and operated by pin 50. Since movement of shutter blade operating ring 14 due to cam 15 causes the same motion of pin 55 attached to ring 14, and since contact lever 54 is in contact with pin 55 it, too, performs a back and forth movement, whereby opening and closing between movable contact 53 and stationary contact 52 can be carried out by one leg of lever 54 because the leg is at all times in contact with movable contact 53.

As will be understood from the above description, when the exchange pawls 56 and 57 are set at the positions shown by the chain lines and exchange pawl 58 is set at the position shown by full line in FIG. 1, the electric circuit for flash synchronization is closed at the same time with the opening of the shutter blades, whereby flash synchronization accommodated to a flash lamp of the "X" class is made possible.

On the other hand, when pawl 58 is set to the position shown by the broken line in FIG. 1, lever 44 is turned in the direction of the arrow around pivotal shaft 45, so that the end of lever 44 detaches from lever 42. Upon detachment of lever 44 from lever 42, the latter rotates clockwise due to the force of spring 42a, whereby hook 41 protrudes towards the outside of the ring 1. When the mechanism is cocked and then released in this state, hook 41 of lever 42 engages with pin 48 on gear 47 of the set of gears shown by the broken line in FIG. 1 during restoration of ring 1, so that the restoration speed of the ring 1 is delayed so as to carry out delay or self-timing operation.

According to the photographic camera shutter of this invention, all of the devices such as the shutter operating device, the device for opening and closing the electric circuit for flash synchronization, the braking device and self-timing device can be effectively and selectively operated by skillful utilization of merely the return movement of the setting ring, so that construction and manufacture of the shutter mechanism become very simple and adjustment of the various devices is made easy and accurate.

While we have shown and described a specific embodiment of our invention, many modifications may be conceived within the spirit and scope of this invention.

It should be understood that while the present disclosure relates to preferred embodiments of the invention only, it is intended to cover all changes and modifications of the examples of the invention herein chosen, which do not constitute departures from the spirit and scope of the invention as set forth in the appended claims.

We claim:

1. A photographic camera shutter operating mechanism comprising in combination: a central ring, mounted rotatably in a setting and an opposite counter-setting direction around the camera objective lens; spring loading means operating on rotation of said central ring in a setting direction, including a power spring mounted with one end to said central ring and anchored with its other end to the camera body; a shutter-blade operating means including a gear-train and also including a pin; a flash-synchronizing means including a spring-loaded lever, pivotably mounted on the camera body; a synchronizer delay means including a pinion and a star wheel concentrically mounted with said pinion; a self-timing means including a gear-train and an exchange lever; means to close the flash-circuit simultaneously with the opening of the shutter blade, engaging said pin of said shutter-blade means upon complete opening of the shutter blade, a release lever means pivotally mounted to the camera-body, each said above means, with its associated mechanical motive means, spaced along the circumference of said central ring; said central ring having on its periphery in spaced relationship: a first gear sector, engaging said gear train of said shutter-blade operating means, a lug fixed with said central ring and engaging said lever of said flash synchronizing means on rotation of said central ring in a counter-setting direction, a second gear sector engaging said pinion of said synchronizer delay-means, a rotatably mounted pawl lever engaging said exchange-lever and said gear train of said self-timing means selectively, a projection fixed with said ring in position to engage said release lever means upon rotating said ring in the setting direction, to hold said ring in the set position against the loaded power spring, means to return said ring to its initial position, a pin carried by said ring and engaging on its countersetting rotation, a lever which releases said shutter blade operating means, said first gear sector, said second gear sector, said lug, said pawl lever, said projection, and said last-named pin being disposed on said central ring in circumferentially-spaced relation thereabout each to operate said shutter blade operating means, said pinion of said synchronizer delay means, said spring-loaded lever, said exchange lever, said release lever means and said shutter blade release lever, all respectively, in predetermined sequence in response to return rotation of said setting ring to initial position.

2. A photographic camera shutter operating mechanism as claimed in claim 1 further comprising means to disengage said synchronizer delay means, said flash synchronizer means, and said self-timing means selectively and simultaneously at option.

References Cited in the file of this patent

UNITED STATES PATENTS

| | | |
|---|---|---|
| 1,843,265 | Barenyi | Feb. 2, 1932 |
| 1,861,256 | Barenyi | May 31, 1932 |
| 2,405,741 | Fuerst | Aug. 13, 1946 |
| 2,727,445 | Rentschler | Dec. 20, 1955 |
| 2,888,866 | Gebele | June 2, 1959 |
| 2,908,207 | Sekine | Oct. 13, 1959 |